Patented Aug. 22, 1950

2,519,550

UNITED STATES PATENT OFFICE 2,519,550

FORMALDEHYDE POLYMERS

Robert L. Craven, Westfield, N. J., assignor to E. I. du Pont de Nemours & Company, Wilmington, Del., a corporation of Delaware No Drawing. Application November 8, 1948, Serial No. 59,030

7 Claims. (Cl. 260—340)

This invention relates to the production of formaldehyde polymers, and more particularly it relates to the production of formaldehyde polymers having a low reactivity.

It is well known that for some formaldehyde uses it is highly desirable to use a formaldehyde polymer having a low reactivity so that the formaldehyde will take part in the reaction very slowly over an extended period of time. For example, in the preparation of resorcinol-formaldehyde resin adhesives, it is often desired that the resin set up very slowly at room temperature, thus permitting storage and handling of the adhesive for a considerable period of time. Such a low-reactivity formaldehyde polymer is also desirable in producing cork-animal glue compositions in which the formaldehyde will not coagulate the glue for long periods of time at temperatures as high as 100° F., but will cause coagulation of the glue at high temperatures of the order of 250° to 300° F.

Low reactivity formaldehyde polymers, suitable for many purposes, have been produced by the process of Walker U. S. Letters Patent 2,369,504. The process of this patent comprises evaporating an aqueous solution of formaldehyde to substantial dryness at a pressure below atmospheric, said aqueous formaldehyde solution containing from 0.01% to 0.3% of a strong non-reactive acid having an ionization constant of at least $1 \times 10^{-2}$ and which does not volatilize during the evaporation to dryness of the solution.

It is an object of this invention to produce an improved formaldehyde polymer of low reactivity.

It is another object of this invention to provide an improved process for the production of a formaldehyde polymer of low reactivity.

It is still another object of this invention to provide a process for the production of low reactivity formaldehyde polymers by which process it is possible to produce such polymers having a greater range of low reactivity.

Other objects of the invention will be more apparent by the description that follows.

The objects of this invention may be accomplished, in general, by evaporating to substantial dryness an aqueous solution of formaldehyde containing a small amount of a strong, non-volatile, non-reactive acid having an ionization constant of at least $1 \times 10^{-2}$, together with a small amount of iron, cobalt or chromium, or soluble salt thereof. The dry product may then be heated for a period of one to five hours to progressively lower the reactivity of the formaldehyde polymers to the particular reactivity desired.

This invention is an improvement over the process of the above-said Walker patent and is based on the discovery that a small amount of iron, cobalt or chromium in the form of the metal or a soluble salt of iron, cobalt or chromium promotes the catalytic effect of the strong, non-volatile, non-reactive acid to produce a formaldehyde polymer of lower reactivity than can be obtained under similar conditions in the absence of iron, cobalt or chromium.

Examples of strong non-volatile acids which are suitable for the present use are: dichloroacetic, maleic, oxalic, phosphoric, pyrophosphoric, sulfuric and trichloracetic acids. Of such acids, the use of sulfuric phosphroic, or oxalic acid is preferred. In addition to such acids, acid salts, e. g., potassium acid sulfate, of polybasic acids having an ionization constant for the second hydrogen atom of $1 \times 10^{-2}$ or greater may be used. Strong acids such as hydrochloric acid which are volatile at temperatures up to 100° C. are not suitable for the present purpose since they are removed during the evaporation treatment.

Acids which react with formaldehyde or the formaldehyde polymer during the evaporation treatment to such an extent that the concentration of the acid is reduced to zero or to a value below the minimum effective concentration, i. e., below about 0.01% by weight based upon the formaldehyde content, are, of course, ineffective for the present purpose. Such an acid is nitric acid. Accordingly in addition to being strong and non-volatile, an acid to be suitable for the present purpose must also be non-reactive towards formaldehyde and the formaldehyde polymer under the conditions employed. By "non-reactive" it is not meant that the acid may not react in some loose or reversible manner with the formaldehyde, but rather that it does not react in such a way as to result in a complete destruction of the acid or a reduction in its concentration below the minimum effective value.

Only a small amount of the acid should be used in carrying out the process. Amounts within the range 0.01% to 0.3% by weight, based upon the weight of the formaldehyde present in the solution being evaporated, may be employed with good results, although the preferred amounts will fall within the range 0.05% to 0.15%. Amounts in excess of 0.3% are unsuitable since they do not permit effective control of the polymerization. Amounts less than 0.01% are insufficient to affect to any substantial extent the polymerization reaction or the type of polymer produced. The acid may be added to the formaldehyde solution at any time during evaporation prior to the point at which precipitation of solid polymer becomes substantial. Good results may be obtained by adding the acid to, for example, 37% formaldehyde solution prior to the evaporation treatment, but best results follow the addition of the acid to the formaldehyde when a formaldehyde concentration of 65% to 90% has been reached. Regardless of when the acid is added, the amount should fall within the limits above specified, such amounts being based upon the weight of the formaldehyde actually present in the solution.

Any aqueous formaldehyde solution may be employed but solutions of at least 30%, preferably 40% to 60%, concentration are most suitable. Solutions which are substantially free from methanol are preferred.

It is preferred that evaporation of the formaldehyde solution be effected under reduced pressure since temperatures in excess of 100° C. should not be employed. Evaporation under conditions such that the final temperature of the product will fall within the range 50° C. to 100° C., and preferably 70° C. to 95° C., gives good results, the pressure on the system being reduced sufficiently to permit evaporation at those temperatures. Evaporation under reduced pressure is, however, not essential and any method which will permit removal of water at a practical rate at a temperature of 50° C. to 100° C. may be used. Thus, a liquid, e. g., ethyl acetate, which forms an azeotrope with water which boils below 100° C. at atmospheric pressure may be added to the formaldehyde solution and the mixture then subjected to evaporation at atmospheric pressure. Under such conditions, the temperature of evaporation will be substantially the boiling point of the azeotropic mixture so that unduly high temperatures will be avoided.

The small amount of strong acid appears to function in the present process as a polymerization catalyst. The acid may react with the formaldehyde or the formaldehyde polymer to some extent. However, any such reaction which may occur appears to be in the nature of a loose combination. The action of the acid is selective in the sense that polymers of extremely high molecular weights such as the alpha and beta polyoxymethylenes, and polymers of low molecular weight such as paraformaldehyde, are not produced by the present methods.

The iron, cobalt or chromium, if added as such, should preferably be in finely divided state (100 mesh or finer) in order to be readily dissolved in the formaldehyde solution. In this case the iron, cobalt or chromium dissolves to form iron, cobalt or chromium formate due to the presence of traces of formic acid in the formaldehyde solution. Preformed iron, cobalt or chromium salts are preferred since they are more easily brought into solution. Any iron, cobalt or chromium salt which is soluble to the extent of 50 parts of the metal per million parts of formaldehyde in the solution may be used. Iron or iron salts are preferred by reason of greater effectiveness. As examples of iron salts may be named ferric chloride, ferric phosphate, ferric sulfate, ferric formate, ferric acetate, and ferric oxalate. The corresponding salts of cobalt or chromium will also have the effect of promoting the catalytic action of the acid, although to a lesser extent.

The iron, cobalt or chromium or salt thereof should be added to the aqueous solution of formaldehyde in such amount that the metal content of the metal substance constitutes five to fifty parts per million parts of formaldehyde in the solution. Less than five parts per million is insufficient to produce any substantial effect as acid catalyst promotor and more than fifty parts per million will produce generally undesirable metal content in the resulting formaldehyde polymer.

The metal or metal salt may be added to the aqueous solution of formaldehyde at any time up to the time that the acid catalyst is added thereto. It is preferably added with the acid. It is also preferred that the formaldehyde solution be somewhat concentrated, 65% to 90% formaldehyde content, before the acid and metal are added. The best results from a standpoint of low reactivity, will be obtained if the formaldehyde solution is concentrated as much as possible short of polymer precipitation, before the acid, metal or metal salt are added, and the solution then rapidly evaporated to dryness.

It is preferred to add the non-volatile acid containing the metal or its salts when the concentration has reached 80% to 90% because these catalysts lower the conversion yield if they are added during the first stages of the vacuum concentration. The solution temperature should lie between 50° C. and 100° C., preferably 80° C. to 95° C. during the final stages of the process. The final solution temperature plays an important part in determining reactivity. Polymers in whose preparation the temperature did not exceed 50° C. are more reactive than those in which the temperature was 80° C. to 95° C. The temperature and time of heating of the solid paraform determines its final reactivity; the higher the temperature and the longer the heating, the lower will be the reactivity. The polymers are preferably heated after the evaporation to dryness at a temperature of 75° C. to 100° C. for a period of one to five hours. Polymers which are heated at temperatures below 75° C. are more reactive. It is preferred to heat the polymers at about 90° C. for two to three hours. Polymers which do not contain the acid catalyst and metal promoter are more reactive.

Traces of iron normally occurring in commercial formaldehyde solution are insufficient to promote the acid catalysis of formaldehyde polymerization.

The reactivity of formaldehyde polymers can be best determined by one of the two following methods:

1. *Glue coagulation method*

Since the chemical and physical characteristics of glue vary greatly from batch to batch, glue samples taken from the same glue batch should be employed to obtain comparative results.

Forty (40) grams of a 25% commercial aqueous animal glue solution are placed in a 500 ml. Erlenmeyer flask, immersed in a water bath held at a temperature of about 75° C. After keeping the glue at this temperature for about one hour, add 0.5 gram of the formaldehyde polymer, the reactivity of which is to be tested. Mix thoroughly with a glass rod and record the time required for the glue to set from the time the formaldehyde polymer was added. The glue is considered set when the stirring rod cannot be readily moved in the glue mixture. The number of minutes required for the glue to set is the glue coagulation value of the polymer. This method of measuring the glue coagulation value of a formaldehyde polymer differs from the method set forth in the said Walker patent since it is adjusted to give short coagulation times with polymers of extremely low reactivity. Absolute values will vary somewhat for different glues but useful comparative values will be obtained for different polymers if the same glue is employed.

2. *Resorcinol reactivity method*

Place 15 ml. N sodium hydroxide into a glass beaker; add 15 grams of reagent grade resorcinol to the sodium hydroxide and let stand one hour at room temperature. Place 25 ml. of the resorcinol solution in an eight inch by one inch glass test tube, adjust the temperature of the solution to 25° C., and add thereto five grams of the formaldehyde polymer, the reactivity of which is to be tested, and agitate to disperse the polymer. Place the test tube in a Dewar flask containing a stopper through which the test tube fits and equip the test tube with a mechanical glass stirrer and a thermometer. Stir the contents of the test tube to maintain the formaldehyde polymer suspended constantly. The same stirring equipment and stirring speed should be used on all tests which are to be compared. Record the time required for the temperature of the test tube contents to reach 60° C. from the time the polymer was added thereto. The time in minutes is taken as the resorcinol reactivity value of the polymer.

The above two methods are not entirely equivalent since a paraformaldehyde that is twice the coagulation time of another when used to cure glue may require more than twice the time for curing a resorcinol adhesive.

The following table illustrates comparative results by the above-described glue coagulation method of a formaldehyde polymer produced by the use only of an acid catalyst as disclosed in the above-identified Walker patent, and a formaldehyde polymer produced in the same manner by the use of an acid catalyst and iron chloride as a catalyst promoter.

|  | Glue Reactivity Value | | | | |
|---|---|---|---|---|---|
|  | Freshly Prepared Dry Polymer | After Heating at 80° C. | | | |
|  |  | 1 Hr. | 2 Hrs. | 3 Hrs. | 4 Hrs. |
| (A) Acid only | 8 | 11 | 11 | 15 | ------ |
| (B) Acid plus iron | 8 | 11 | 18 | 27 | 45 |

The results illustrated in this table show that the glue reactivity values of formaldehyde polymer prepared by the use of iron as a promoter may vary from 8 to 27 depending upon the time of heating the dry polymer, whereas a similar polymer prepared by the use only of acid catalyst under similar circumstances may vary only between 8 and 15. Whereas continued heating of the iron-promoted polymer produces a polymer of a very low reactivity, similar heating of a similar polymer which is not so promoted produces polymer of only a moderately low reactivity.

The following table illustrates the melting point range and resorcinol reactivity values of the products of this invention, commercial paraformaldehyde, the product of the process shown in the above-said Walker patent and alpha-polyoxymethylene.

|  | Melting Point Range, °C. | Resorcinol Reactivity Value |
|---|---|---|
|  |  | Min. |
| Commercial paraformaldehyde | 120-130 | 3 |
| Walker's paraformaldehyde | 160-170 | 7-20 |
| Product of this process | 165-180 | Over 20 |
| Alpha-polyoxymethylene | 170-180 | 45-70 |

The following examples illustrate the preferred methods of practicing the process of this invention. It is to be understood that the details given in the examples are not limitative of the scope of the invention.

Example I

Thirteen thousand (13,000) grams of 55.5% formaldehyde solution containing approximately fifty parts per million iron as iron formate were charged to a stainless steel Baker-Perkins kneader equipped with a steam jacket and attached to a condenser. The solution was concentrated to 87.1% by vacuum distillation. Six and one-half (6.5) grams of 85% phosphoric acid (0.07% of the formaldehyde in the solution charged) was added dropwise to the concentrated formaldehyde with stirring. After a few minutes reaction polymer precipitated, forming a thick paste which dried rapidly to a solid polymer. The agitation produced by the kneader reduced the polymer to a powder. The solid polymer was then heated with occasional agitation, maintaining the temperature at 72° C. for two hours and at 82° C. for two hours. Samples were taken at the end of each hour's heating. There were obtained 2,650 grams of product containing 96.3% formaldehyde. The polymer was cooled before discharging from the kneader. The reactivity values of these samples are listed below:

*Glue coagulation test*

| A | B | C | D |
|---|---|---|---|
| Immediately on drying | After 2 Hrs. at 72° C. | (B)+1 Hr. at 82° C. | (B)+2 Hrs. at 82° C. |
| Min. 15 | Min. 18 | Min. 38 | Min. 48 |

Regular paraformaldehyde—3 minutes.

Example II

Ten thousand (10,000) grams of 56.4% formaldehyde solution were charged to a Baker-Perkins kneader equipped with a steam jacket and attached to a condenser, and vacuum concentrated to 89% formaldehyde. Five (5.0) grams of 85% phosphoric acid containing 0.15 gram anhydrous ferric chloride were then added dropwise to the concentrated formaldehyde solution (0.075% $H_3PO_4$ and 10 parts per million Fe based on formaldehyde solution charged). After stirring a few minutes, polymer precipitated, forming a thick paste. Vacuum was re-applied and the paste dried to a dry powder. There was obtained 2,655 grams of dry solid polymer containing 98.8% formaldehyde. The dry polymer was heated at 80° C. to 85° C. Samples were removed after each hour's heating. The polymer was cooled by passing cold water through the jacket. The following are the glue coagulation values of the polymer.

| Freshly Prepared Dry Polymer | After 1 Hr. | 2 Hours | 3 Hours | 4 Hours |
|---|---|---|---|---|
| 11 | 15 | 23 | 28 | 34 |

Example III

Three thousand five hundred and forty (3,540) pounds of 43.73% formaldehyde were charged to a large stainless steel Baker-Perkins kneader and concentrated to approximately 80%. The vacuum was released and the solution heated to 83° C. at atmospheric pressure. One and seven-tenths (1.7) pounds of 85% phosphoric acid containing 2.26 grams anhydrous ferric chloride were added slowly to the concentrated solution with agitation. After a few minutes agitation at atmospheric pressure, polymer precipitated, forming a paste. Vacuum was reapplied and the paste dried to a solid polymer in powder form. One thousand, one hundred (1,100) pounds paraformaldehyde containing 96.49% formaldehyde were obtained. The dry polymer was heated two hours at 80° C. to 82° C. The charge was cooled by running cold water through the jacket. The resorcinol reactivity value of the polymer after heating at 80° C. to 82° C. for two hours and cooling was 32 minutes.

*Example IV*

Three thousand, three hundred and thirty (3,330) pounds of 42.55% formaldehyde solution were charged to the Baker-Perkins stainless steel kneader and concentrated by vacuum distillation to approximately 80%. The vacuum was released and the solution heated to 90° C. One and seven-tenths (1.7) pounds of 85% phosphoric acid containing 2.26 grams ferric chloride were added slowly with agitation. After a few minutes stirring, polymer had precipitated, forming a thick paste. Vacuum was reapplied and the paste dried to a solid polymer. The polymer was heated four hours at about 80° C. and cooled before discharging from the kneader. The following are the resorcinol reactivity value and the melting point range of the poylmer.

| Resorcinol | Melting Range |
|---|---|
| *Minutes* 200 | °C. 176-183 |

Similar examples may be carried out with the use of ferric phosphate, ferric sulfate, ferric formate, ferric acetate, and ferric oxalate instead of ferric chloride with approximately the same results as shown in Examples I to IV. The examples may also be repeated using sulfuric acid, di- and tri-chloracetic acids, maleic acid, oxalic acid, as well as the strong acid salts above described instead of phosphoric acid with corresponding results. Similar results but to a somewhat lesser degree can be obtained by the use of cobalt, chromium, or salts thereof.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of preparing a solid polymer of formaldehyde which comprises evaporating to dryness at a subatmospheric pressure and at a temperature not to exceed 100° C. an aqueous solution of formaldehyde containing between 0.01% and 0.3%, based on the weight of the formaldehyde, of a non-reactive acid having an ionization constant of at least $1 \times 10^{-2}$ and which is non-volatile during said evaporation and between 5 and 50 parts of a metal from the group consisting of iron, cobalt and chromium per million parts formaldehyde, said metal being added in the form of a substance from the group consisting of the metal and metal salts thereof soluble in said solution to the extent of at least 50 parts of the metal per million parts of formaldehyde.

2. The process of preparing a solid polymer of formaldehyde which comprises evaporating to dryness at a subatmospheric pressure and at a temperature not to exceed 100° C. an aqeuous solution of formaldehyde containing between 0.01% and 0.3%, based on the weight of the formaldehyde, of a non-reactive acid having an ionization constant of at least $1 \times 10^{-2}$ and which is non-volatile during said evaporation and between 5 and 50 parts iron per million parts formaldehyde, said iron being present as iron chloride.

3. The process of preparing a solid polymer of formaldehyde which comprises evaporating to dryness at a subatmospheric pressure and at a temperature not to exceed 100° C. an aqueous solution of formaldehyde containing between 0.01% and 0.3%, based on the weight of the formaldehyde, of a non-reactive acid having an ionization constant of at least $1 \times 10^{-2}$ and which is non-volatile during said evaporation and between 5 and 50 parts iron per million parts formaldehyde, said iron being present as iron sulfate.

4. The process of preparing a solid polymer of formaldehyde which comprises evaporating to dryness at a subatmospheric pressure and at a temperature not to exceed 100° C. an aqueous solution of formaldehyde containing between 0.01% and 0.3%, based on the weight of the formaldehyde, of a non-reactive acid having an ionization constant of at least $1 \times 10^{-2}$ and which is non-volatile during said evaporation and between 5 and 50 parts iron per million parts formaldehyde, said iron being present as iron phosphate.

5. The process of claim 1 in which the evaporation to dryness is completed at a temperature within the range 50° C. to 100° C.

6. The process of claim 1 in which the evaporation to dryness is completed at a temperature within the range 80° C. to 95° C.

7. The process of claim 1 in which the evaporation to dryness is completed at a temperature within the range 80° C. to 95° C. and the dry polymer is heated at a temperature of 75° C. to 100° C. for a period of one to five hours.

ROBERT L. CRAVEN.

REFERENCES CITED

The following references are of record in the file of this patent:

UNITED STATES PATENTS

| Number | Name | Date |
|---|---|---|
| 2,369,504 | Walker | Feb. 13, 1945 |